(12) United States Patent
Wu et al.

(10) Patent No.: US 7,476,707 B2
(45) Date of Patent: Jan. 13, 2009

(54) PREPARATION OF HIGH SOLID POLYESTER POLYOL/SILICA NANOCOMPOSITE RESIN WITH LOW VISCOSITY AND RELATED NANOCOMPOSITE COATINGS

(75) Inventors: Limin Wu, Shanghai (CN); Shuxue Zhou, Shanghai (CN); Yongchun Chen, Shanghai (CN); Bo You, Shanghai (CN); Guangxin Gu, Shanghai (CN)

(73) Assignee: Fudan University, Shanghai (CN)

( * ) Notice: Subject to any disclaimer, the term of this patent is extended or adjusted under 35 U.S.C. 154(b) by 643 days.

(21) Appl. No.: 11/035,885

(22) Filed: Jan. 18, 2005

(65) Prior Publication Data
US 2006/0122314 A1    Jun. 8, 2006

(30) Foreign Application Priority Data
Dec. 6, 2004    (CN)    .................... 2004 1 0089133
Dec. 6, 2004    (CN)    .................... 2004 1 0089134

(51) Int. Cl.
*C08G 63/02*    (2006.01)
(52) U.S. Cl. ...................................... 524/847; 524/493
(58) Field of Classification Search .............. 524/847, 524/493
See application file for complete search history.

(56) References Cited

U.S. PATENT DOCUMENTS

| | | | |
|---|---|---|---|
| 4,526,910 A | 7/1985 | Das et al. | |
| 4,652,470 A | 3/1987 | Das et al. | |
| 5,853,809 A | 12/1998 | Campbell et al. | |
| 6,020,419 A | 2/2000 | Bock et al. | |
| 6,387,519 B1 | 5/2002 | Anderson et al. | |
| 6,592,944 B1 | 7/2003 | Uhlianuk et al. | |
| 6,657,001 B1 | 12/2003 | Anderson et al. | |
| 6,759,478 B2 | 7/2004 | Anderson et al. | |
| 6,770,705 B2 | 8/2004 | Vanier et al. | |
| 6,803,408 B2 | 10/2004 | Anderson et al. | |

FOREIGN PATENT DOCUMENTS

JP        56-045922    *    4/1981

* cited by examiner

*Primary Examiner*—Kuo-Liang Peng
(74) *Attorney, Agent, or Firm*—Crowell & Moring LLP

(57) ABSTRACT

A high solid polyester polyol/silica nanocomposite resin with low viscosity is synthesized by an in situ polymerization method, namely conducting condensation polymerization of polyol/diacid monomer with a molar ratio of 1.1~1.5 in the presence of colloidal silica nanoparticles with a diameter of 10~150 nm. The resulted nanocomposite resins has a solid content of >95%, molecular weight of 1000~5000 g/mol and hydroxyl value of 80-200 mg KOH/g, and a viscosity in the range of 800-2000 mPa.s. The viscosities are especially lower than those obtained by a blending method. The nanosilica content in the nanocomposite resin is 1~15% (based on the total solid content of nanocomposite resin). The high solid polyester polyol/silica nanocomposite resin was curable with isocyanate or melamine to prepare high solid transparent nanocomposite coatings with obviously improved abrasion and scratch resistance, hardness, weatherability etc.

13 Claims, No Drawings

PREPARATION OF HIGH SOLID POLYESTER POLYOL/SILICA NANOCOMPOSITE RESIN WITH LOW VISCOSITY AND RELATED NANOCOMPOSITE COATINGS

FIELD OF THE INVENTION

This invention relates to a process for preparing high solid polyester polyol/silica nanocomposite resin and a coating based thereon using colloidal silica nanoparticles. The preparation of the present invention is simple and different from those ever reported.

TECHNICAL BACKGROUND

High solid polyester polyol resin is an important, environment-friendly resin, and is usually prepared by condensation polymerization of diol and/or polyol with diacid monomers. It has been widely used in high solid automotive coatings, furniture coatings, coiling coatings etc. From the viewpoint of environment protection, lower viscosity of polyester polyol resin is preferred, which means lower VOC in its corresponding coatings. Generally, the viscosity of polyester polyol is reduced by increasing the molar ratio of diol(and/or polyol)/diacid. However, high dosage of polyol monomer in condensation polymerization will produce polyester polyol resin with high hydroxy value and thus more crosslinking agent is needed in curable coating compositions. Meanwhile, a polyester polyol resin with a molecular weight that is too low, will negatively impact the properties of coatings such as impact resistance. Thus, to attain a proper balance between the VOC and the properties of coatings, the reduction of molecular weight of polyester polyol resin is often limited for certain monomer composition. In other words, besides the composition of polyester polyol resin, adjusting the molecular weight of polyester polyol resin is also limited to improve the properties of polyester based coatings.

In recent years, accompanying with development of nanotechnology and nanomaterial, inorganic nanoparticles such as silica, alumina, zirconia and so on were incorporated into the coatings to prepare transparent coatings with improved abrasion and scratch resistance, hardness etc. Among them, nanosilica in both fumed silica and colloidal silica state was most widely employed because of its relatively cheap price and better match of refractive index with most of the resins. To achieve the better dispersion and compatibility of nanosilica with coatings or offer the reactivity with the binder in coatings, surface modification of nanosilica particles was usually adopted. In U.S. Pat. No. 5,853,809, colloidal silica was modified with functional silane coupling agent such as carbamate functional silane coupling agent before introducing into clearcoat. While in U.S. Pat. No. 6,803,408, colloidal silica was firstly dispersed in pre-prepared polysiloxane polyol and then mixed with other component of coatings. Besides surface modification, a special dispersing method, namely jet dispersion method through nozzle at high pressure, was also proposed to successfully incorporate hydrophobic fumed silica into acrylic based polyurethane clearcoat, just as described in U.S. Pat. No. 6,020,419. Transparent nanocomposite coatings with improved scratch resistance were all obtained in the above reported patents. But unfortunately, the surface modification of nanosilica will complicate the preparing process of nanocomposite coating and the remained free modifying agents maybe reduce the copolymerization rate (specially for the case that vinyl containing silane coupling agent modified inorganic nanoparticles firstly dispersed in acrylate monomer) and/or deteriorate the properties of the resulted coatings. For jet dispersion method, a specific dispersing apparatus, which is distinctly different from conventional mechanical stirrer or miller used in coating manufacture, has to be set up and thus increase the investment. Thus, development of a simple process for preparation of transparent nanocomposite coating is very necessary.

Colloidal silica particles exist in the form of individual dispersion in the media such as water, alcohol and other organic solvent. Usually, there are large amount of hydroxyl group on its surface. These hydroxyl groups will lead to form strong hydrogen bond interaction between colloidal silica and resins especially those high degree hydroxyl functionalized resins, or between colloidal silica particles themselves. Higher hydrogen bond interaction means higher viscosity of colloidal silica containing resin and coatings. Therefore, colloidal silica particle was ever used to improve the rheological properties of high solid coatings in previous patents such as U.S. Pat. No. 4,526,910. However, the thickening role of colloidal silica is not welcome when colloidal silica is acted as the additive for improving the mechanical properties of high solid coatings because it will strongly decrease the incorporation amount of colloidal silica in coatings. Therefore, shielding the surface hydroxyl group of colloidal silica is needed. Just as described above, surface modified with modifying agent such as functional silane coupling agent was efficient to protect the surface of colloidal silica, but it is complicated.

To simply the process of application of colloidal silica in coatings while maintaining the efficiency of colloidal silica in improving the properties of high solid coatings, a novel process was proposed especially for preparation of high solid polyester polyol/silica nanocomposite resin. The resin is curable with isocyanate or melamine to obtain high solid nanocomposite coatings which can be used as scratch resistant automotive coatings, coil coatings, plastic coatings, metal coatings etc.

SUMMARY OF THE INVENTION

The invention relates to a process for preparation of high solid polyester polyol/silica nanocomposite resin with low viscosity via in situ polymerization. Namely, colloidal silica sol is first mixed with alcoholic and diacid monomer, then distilled at 100~120° C. to evaporate the solvent. After evaporation, the reactants are continued to be heated to conduct the polymerization in the temperature range of 120~24° C. for about 3~8 h.

The high solid polyester polyol/silica nanocomposite resin is curable with isocyanate or melamine to prepare high solid nanocomposite coating with high hardness, tensile strength, abrasion resistance and weatherability

DETAILED DESCRIPTION OF THE INVENTION

The present invention relates to a process for preparation of high solid polyester polyol/silica nanocomposite resin via in situ polymerization method and its based coating composition.

In this process, colloidal silica dispersion was first mixed with alcoholic monomer and diacid monomer in a reactor and then heated to 100~120° C. to evaporate all the solvent. After the colloidal silica in monomer mixture obtained, the reactants is further stepwisely heated to 160~240° C. during 3~8 hours to carried out the condensation polymerization. Finally, transparent high solid polyester polyol with the properties such as solid content of >95%, viscosity of 800~2000 mPa.s, molecular weight of 1000~5000 g/mol and hydroxyl value of 80-200 mg KOH/g was synthesized and at the same time part of polyester polyol molecules was successfully chemical-bonded with the surface of colloidal silica particles through the reaction of diacid monomer with silanol group and/or ethoxyl group remained on the silica surface. Comparing with the high solid polyester polyol/silica nanocomposite resin prepared by direct mixing of pre-synthesized high solid polyester polyol resin with colloidal silica, the viscosity of nanocomposite resin prepared by in situ polymerization method is much lower just resulting from the shielding role of chemical bonded polyester polyol molecules for silanol group.

The said colloidal silica dispersion used for preparation of nanocomposte resin can be choose from aqueous silica sol, silica alcosol, or organic silica sol, but preferably aqueous silica sol or silica alcosol. These silica sols can be obtained from market (i.e., Nissan Company, Degussa Company, Zhejiang Yuda Chemical Industrial Co. Ltd. of China) or prepared via a sol-gel process of tetraethoxylsilane (TEOS) or tetramethoxylsilane(TMOS). The particle size of colloidal silica particle is in the range from 1 nm to 1000 nm, but preferably from 2 nm to 200 nm and most preferably from 10 nm to 150 nm. The percentage of colloidal silica in polyester polyol/silica nanocomposite resin is in the range from 1% to 15%. Too high amount of colloidal silica used will lead to gel during in situ polymerization whereas too low colloidal silica content will be not sufficient for improving the mechanical properties of its corresponding resulted high solid coating.

The said alcoholic monomer for preparation of high solid polyester polyol resin is chosen from diol and/or triol monomers with molecular weight of 60-500 g/mol. These alcoholic monomers include: ethylene glycol, 1,2-propanediol, 1,3-propanediol, 1,4-butanediol, 1,3-butanediol, 1,6-hexanediol, 2,2-dimethyl-1,3-propanediol, diethylene glycol, 2-ethyl-2-propyl-1,3-propanediol, 1,4-cyclohexanediol, cyclohexane dimethanol, polyethylene glycol, polyether diol, propanetriol, trimethylol propane, polyether triol and etc. One or more of the above alcoholic monomers should be employed in polymerization. Moreover, the alocoholic monomer mixture should contain at least one diol monomer.

The said diacid monomer is selected from aliphatic, alicyclic or aromatic dicarboxylic acid and their anhydrides. These suitable monomers include: malonic acid, succinic acid, glutaric acid, adipic acid, pimelic acid, suberic acid, azelaic acid, sebacic acid, brassylic acid, thapsic acid, isophthalic acid, terephthalic acid, phthalic acid, 1,4-cyclohexanediacid, hexahydro-phthalic acid and their anhydrides. One or no more than 5 monomers mixture is employed in the polymerization.

The molar ratio of OH/COOH is limit in the range of 1.1~1.5, wherein —OH group come from the above described alcoholic monomer and —COOH group from diacid monomer. It is impossible to get high solid polyester polyol resin for high solid coatings when the molar ratio of OH/COOH is less than 1.1. However, for the cases with molar ratio of OH/COOH large than 1.5, the molecular weight of the resulted high solid polyester polyol will be too low to satisfy the properties of high solid coatings.

The said process for preparation of high solid polyester polyol/silica nanocomposite resin mainly consists of evaporation process and polymerization process. In evaporation process, the mixture of alcoholic monomers, diacid monomers and colloidal silica dispersion is heated under vigorous stirring. Better evaporation temperature should be hold at that the solvent can be distilled and meanwhile at least one of the monomers is in liquid state. This temperature generally locate at the range of 100~120° C. To avoid the escape of monomer with low boiling point, the circumfluence condensed apparatus should be equipped with the reactor. The evaporation process does not stop until nearly no distilled solvent is observed. The time for evaporation usually needs 0.5~2 hours. After evaporation process, the reactants is continued to heat to a temperature at which all monomers are in liquid state. Then, certain amount of catalyst is charged into the reactor. To complete the condensation polymerization, the temperature is stepwisely enhanced but less than 240° C. since the organic components in the reactor are easy to decompose and oxidate above that temperature. Generally, two step temperatures should be used during polymerization process. The total polymerization time needs 3~8 hours. The temperature range is from 120° C. to 240° C., preferably from 140° C. to 200° C., most preferably from 160° C. to 190° C.

The properties of the resulted polyester polyol/silica nanocomposite resin should be controlled as follows: solid content: >95%, hydroxyl value: 80~200 mg KOH/g, silica content: 1~15 wt % (based on the total solid content of nanocomposite resin), molecular weight: 1000~5000 g/mol. With these properties, the viscosity of polyester polyol/silica nanocomposite resin is usually in the range of 800~2000 mPa.s, which is suitable for preparation of high solid nanocomposite coatings. Under the same solid content, the viscosity of nanocomposite resin prepared by in situ polymerization method is nearly the same as that of corresponding pure polyester polyol resin and moreover slightly changes with colloidal silica content, while the viscosity of nanocomposite resin prepared by blending method is relatively high.

The resulted polyester polyol/silica nanocomposite resin can be further cured with isocyanate or melamine to prepare high solid nanocomposite coatings with excellent mechanical properties such as high hardness, abrasion and scratch resistance, elastic modulus and etc.

The high solid nanocomposite coating compositions mainly contain crosslinking agent (isocyanate or melamine), high solid polyester polyol/silica hybrid resin and catalyst. When isocyanate is used, the coating is a two-K coating with high solid polyester polyol/silica hybrid resin as component A and mixture of isocyanate and catalyst as component B. However, if melamine used as crosslinking agent, one-K coating can be prepared by direct mixing of the coating compositions.

Nonlimiting examples of suitable polyisocyanates include aliphatic polyisocyanates, such as aliphatic diisocyanates, for example, 1,4-tetramethylene diisocyanate and 1,6-hexamethylene diisocyanate; cycloaliphatic polyisocyanates, for example, 1,4-cyclohexyl diisocyanate and isophorone diisocyanate; and aromatic polyisocyanates, for example, 4,4'-diphenylmethane diisocyanate, 1,3-phenylene diisocyanate, and tolylene diisocyanate. The amount of isocyanate is added based on the molar ratio of NCO/OH ranging from 0.8 to 1.5, preferably from 1.0 to 1.3.

Nonlimitting examples of suitable catalysts for the 2-K coatings with isocyanate as crosslinking agent include dibutyltin dilaurate, tin acetate and triethylenediamine, and non-limitting examples of suitable catalysts for the nanocomposite coatings with melamine as crosslinking agent include acidic materials, for example, acid phosphates, such as phenyl acid phosphate, and substituted or unsubstituted sulfonic acids such as dodecylbenzene sulfonic acid or para-toluene sulfonic acid. The percentage of catalyst needed is 0.01~0.1% based on the total solid content of nanocomposite coatings.

The resulted nanocomposite coating is cured by first drying at ambient temperature and then heating at 80~120° C. for polyester polyol/isocyanate coating system and at 140~160°

C. for polyester polyol/melamine coating system. Comparing with pure polymer coating, the mechanical properties of nanocomposite coatings are greatly improved, namely, 30~90% of abrasion resistance, 1~3 times of tensile strength and 30~150% of hardness improvement are achieved. Meanwhile, the UV-shielding property of nanocomposite coating is also obviously increased.

The polyester polyol/silica nanocomposite resin based coatings are very useful in abrasion and scratch resistant automotive coatings, coil coatings, plastic coatings, metal coatings and etc.

Tests

Viscosity

The viscosities of high solid polyester polyol resins with/without colloidal silica particles were determined by a rheoviscometer at 20° C.±1° C. (NDJ-1, Shanghai Sendi Technology Development Corporation, China).

Tg

The Tg of coating film was determined by dynamic mechanical analysis (DMA) measurements carried out on DMA 242 (NETZSCH Inc., Germany). The samples were quickly cooled to −50° C. and equilibrated at that temperature for 3 minutes, and then heated to 120° C. at a frequency of 10 Hz with a constant heating rate of 5° C./min under nitrogen atmosphere.

Tensile Property

Tensile properties were acquired by an Instron model DXLL 1000-20000 tensometer (Shanghai, China). The specimens for tensile tests were dumbbell cut from the molded polymer films according to Die C of ASTM-D412t, and carried out at a crosshead speed of 200 mm/min. A 20 mm benchmark and the original cross-sectional area were utilized to calculate their tensile properties. The tensile strength and elongation at break were automatically calculated by the computer connected to the Instron. The average of at least five measurements for each sample was reported, the experimental error was ±10%.

Abrasion resistance

Abrasion resistance was determined on a round glass board according to GB1768-79. 120# rubber abrasive wheel, 200 cycle and 1000 g load were adopted in the test. The abrasion resistance reported was the average value of 5 independent tests.

Pendulum Hardness

Pendulum hardness was determined using pendulum hardness tester according to GB/T1730-93 (a national standard of China). The time swinging from 5° to 2° for the pendulum on the glass with and without polymer films were named as t and $t_0$, respectively. The ratio of $t/t_0$ is regarded as pendulum hardness.

EXAMPLES

Example 1

Pathalic anhydride, adipic acid, diethylene glycol and 1,4-butanediol with molar ratio of 1:5:1.3:7 (defined as monomer composition A) was charged into a reactor which was equipped with mechanical stirrer, thermometer with a temperature controller, $N_2$ inlet, a Graham condenser and a heating mantle. When the reactor was heated to around 120° C. at a slow stream of $N_2$, 0.05 wt % of catalyst based on total weight of monomers was added, the reaction was kept at 160° C. for 4 h and 180° C. for another 1 h to finish the reaction.

Example 2

Colloidal silica alcosol with average particle size of 30 nm (30% solid content in ethanol) was mixed with the high solid polyester polyol resin of example 1 based on the weight ratio of 100:14 (polyester polyol/colloidal silica sol) by vigorous stirring, and then heated to 160° C. and hold at that temperature for 1 h to remove the alcohol.

Example 3

Colloidal silica alcosol with average particle size of 80 nm (30% solid content in ethanol) was mixed with the high solid polyester polyol resin of example 1 based on the weight ratio of 100:14 (polyester polyol/colloidal silica sol) by vigorous stirring, and then heated to 160° C. and hold at that temperature for 1 h to remove the alcohol.

Example 4

Succinic acid, 1,4-cyclohexane diacid, polyethylene glycol (molecular weight: 200 g/mol) and 1,4-butanediol with mole ratios of 1:4:1:5 (defined as monomer composition B) was charged into a reactor which was equipped with mechanical stirrer, thermometer with a temperature controller, $N_2$ inlet, a Graham condenser and a heating mantle. When the reactor was heated to around 120° C. at a slow stream of $N_2$, 0.05 wt % of catalyst based on total weight of monomers was added, the reaction was kept at 170° C. for 4 h and 200° C. for another 2 h to finish the reaction. Then, colloidal silica alcosol with average particle size of 30 nm (30% solid content in ethanol) was mixed with the above pre-synthesized polyester polyol resin based on the weight ratio of 100:14 (polyester polyol/colloidal silica) by vigorous stirring, and distilled at 160° C. for 1 h to remove the alcohol.

Example 5

Pathalic anhydride, adipic acid, diethylene glycol and 1,4-butanediol with mole ratios of 1:5:1.3:7 was charged into a reactor which was equipped with mechanical stirrer, thermometer with a temperature controller, $N_2$ inlet, a Graham condenser and a heating mantle. At the same time, colloidal silica sol with average particle size of 30 nm (30% solid content in ethanol) was also added based on 4% silica content of total theoretical solid content of nanocomposite resin. The mixture of monomer with colloidal silica sol was heated to around 120° C. and hold at that temperature for 1h to evaporate the solvent under vigorous stirring. Then, 0.05 wt % of catalyst based on total weight of monomers was added, the reaction was kept at 160° C. for 4 h and 180° C. for another 1h to finish the reaction.

Example 6

High solid polyester polyol/silica nanocomposite resin was prepared according to the same process of example 5. But the colloidal silica sol with average particle size of 80 nm was used, replacing the colloidal silica particle with size of 30 nm.

Example 7

High solid polyester polyol/silica nanocomposite resin was prepared according to the same process of example 5. But the colloidal silica sol was added based on 8 wt % silica content of total theoretical solid content of nanocomposite resin.

Example 8

Succinic acid, 1,4-cyclohexanediacid, polyethylene glycol (molecular weight: 200 g/mol) and 1,4-butanediol with molar ratios of 1:4:1:5 was charged into a reactor which was equipped with mechanical stirrer, thermometer with a temperature controller, $N_2$ inlet, a Graham condenser and a heating mantle. At the same time, colloidal silica sol with average particle size of 30 nm (30% solid content in ethanol) was also added based on 4% silica content of total theoretical solid content of nanocomposite resin. The mixture of monomer with colloidal silica sol was heated to around 120° C. and hold at that temperature for 1 h to evaporate the solvent under vigorous stirring. Then, 0.05 wt % of catalyst based on total weight of monomers was added, the reaction was kept at 170° C. for 4h and 200° C. for another 2 h to finish the reaction.

Table 1 summarized the properties of the resins prepared in Examples 1~8.

Example 9

The polyester polyol resin of example 1 was further mixed with isophorone diisocyanate based on 1.2:1 of NCO/OH (molar ratio) and certain amount of solvent. Just before application, 0.05 wt % of dibutyltin dilaurate based on the total weight of the resins and isophorone diisocyanate on solids was mixed thoroughly. The polyurethane films with thickness ~45 μm were prepared using a drawdown rod by casting the above solution on tinned iron panels that were pretreated to remove the grease. The coatings were cured at 80° C. for half an hour then kept at ambient temperature for two weeks to obtain completely cured coatings.

Example 10

The polyester polyol/silica nanocomposite resin of example 2 was further mixed with isophorone diisocyanate based on 1.2:1 of NCO/OH (molar ratio) and certain amount of solvent. Just before application, 0.05 wt % of dibutyltin dilaurate based on the total weight of the resins and isophorone diisocyanate on solids was mixed thoroughly. The polyurethane films with thickness ~45 μm were prepared using a drawdown rod by casting the above solution on tinned iron panels that were pretreated to remove the grease. The coatings were cured at 80° C. for half an hour then kept at ambient temperature for two weeks to obtain completely cured coatings.

Example 11

The polyester polyol/silica nanocomposite resin of example 5 was further mixed with isophorone diisocyanate based on 1.2:1 of NCO/OH (molar ratio) and certain amount of solvent. Just before application, 0.05 wt % of dibutyltin dilaurate based on the total weight of the resins and isophorone diisocyanate on solids was mixed thoroughly. The polyurethane films with thickness ~45 μm were prepared using a drawdown rod by casting the above solution on tinned iron panels that were pretreated to remove the grease. The coatings were cured at 80° C. for half an hour then kept at ambient temperature for two weeks to obtain completely cured coatings.

Example 12

The polyester polyol/silica nanocomposite resin of example 4 was thoroughly mixed with melamine based on 1.1:1 of NH/OH (molar ratio), solvent and 0.05 wt % of para-toluene sulfonic acid based on the total weight of the resins and melamine on solids. The coatings with thickness ~45 μm were prepared using a drawdown rod by casting the above solution on tinned iron panels that were pretreated to remove the grease. The coatings were cured at 140° C. for half an hour.

Example 13

The polyester polyol/silica nanocomposite resin of example 8 was thoroughly mixed with melamine based on 1.1:1 of NH/OH (molar ratio), solvent and 0.05 wt % of para-toluene sulfonic acid based on the total weight of the resins and melamine on solids. The coatings with thickness 30~50 μm were prepared using a drawdown rod by casting the above solution on tinned iron panels that were pretreated to remove the grease. The coatings were cured at 140° C. for half an hour.

The properties of the coatings of Examples 9~13 are summarized in Table 2.

TABLE 1

The properties of high solid polyester polyol/silica nanocomposite resin

| Properties | Example 1 | Example 2 | Example 3 | Example 4 | Example 5 | Example 6 | Example 7 | Example 8 |
|---|---|---|---|---|---|---|---|---|
| Monomer composition | A | A | A | B | A | A | A | B |
| Theoretical colloidal silica content[a], % | 0 | 4 | 4 | 4 | 4 | 4 | 8 | 4 |
| Silica particle size | — | 30 | 80 | 30 | 30 | 80 | 30 | 30 |
| Preparation method | — | Blending | Blending | Blending | In situ polymerization | In situ polymerization | In situ polymerization | In situ polymerization |
| Solid content[b], % | 99.0 | 99.0 | 99.0 | 98.5 | 99.0 | 99.0 | 99.1 | 98.5 |
| Average molecular weight[c], g/mol | 1200 | 1200 | 1200 | 3000 | 1100 | 1150 | 1050 | 2900 |
| Hydroxyl value, mgKOH/g | 130~140 | 130~140 | 135~140 | 100~110 | 130~140 | 130~140 | 130~140 | 100~110 |
| Viscosity, mPa · s | 1250 | 3750 | 2900 | 4100 | 1300 | 1750 | 1935 | 1950 |

Note:
[a] based on the total solid content of polyester polyol/silica nanocomposite resin;
[b] determined by heating at 150° for 1 h;
[c] determined by GPC with narrow PSt as the standard.

TABLE 2

Properties of high solid polyester polyol based nanocomposite coatings

| | Items | | | | |
|---|---|---|---|---|---|
| | Example 9 | Example 10 | Example 11 | Example 12 | Example 13 |
| Resin from | Example 1 | Example 2 | Example 5 | Example 4 | Example 8 |
| Crosslinking agent | isophorone diisocyanate | isophorone diisocyanate | isophorone diisocyanate | Melamine | Melamine |
| Tg. ° C. | 42 | 44 | 52 | 48 | 63 |
| Tensile strength, MPa | 3.1 | 10.2 | 11.5 | 9.3 | 12.8 |
| Abrasion resistance, mg | 33 | 31 | 21 | 25 | 18 |
| Pendulum hardness | 0.42 | 0.52 | 0.57 | 0.58 | 0.67 |

What we claim is:

1. A process for preparation of high solid polyester polyol/silica nanocomposite resin with low viscosity, comprising mixing an alcoholic monomer, a diacid monomer and a colloidal silica alcosol, evaporating the solvent from said colloidal silica alcosol by distillation, adding a catalyst, and then allowing condensation polymerization to occur, wherein the molar ratio of said alcoholic monomer to said diacid monomer is determined based on the molar ratio of OH/COOH that is from 1.1 to 1.5.

2. The process of claim 1, wherein colloidal silica alcosol has an average particle size from 1 nm to 1000 nm.

3. The process of claim 2, wherein the average particle size of the colloidal silica alcosol is from 2 nm to 200 nm.

4. The process of claim 3, wherein the average particle size of the colloidal silica alcosol is from 10 nm to 150 nm.

5. The process of claim 1, wherein the silica content in the high solid polyester polyol/silica nanocomposite resin is in the range of 1~15 wt % based on total solids.

6. The process of claim 1, wherein the alcoholic monomer is a monomer, or a mixture of at least one diol monomer and no more than 4 diol and triol monomers with a molecular weight of 60~500 g/mol.

7. The process according to claim 1, wherein the diacid monomer is a monomer or a mixture of no more than 5 monomers selected from the group consisting of aliphatic, alicyclic, aromatic dicarboxylic acid, and their anhydrides.

8. The process of claim 1, wherein the evaporation process is carried out by distilling the mixture at a temperature of about 100~120° C. for about 0.5~2 h.

9. The process of claim 1, wherein the in situ condensation polymerization process is conducted at a temperature between 120~240° C. for about 3~8 h.

10. The process of claim 1, wherein the high solid polyester polyol/silica nanocomposite resin is curable with isocyanate and melamine in the presence of a catalyst to preprepare a high solid nanocomposite coating.

11. The process of claim 10, wherein the isocyanate is selected from the group consisting of aliphatic, cycloaliphatic and aromatic polyisocyanates.

12. The process of claim 10, wherein the isocyanate is added at a molar ration of 0.8~1.5 (NCO/OH).

13. The process of claim 10, wherein the catalyst is selected from the group consisting of dibutyltin dilaurate, tin acetate and triethylenediamine for the coating with isocyanate as a crosslinking agent, and from the group consisting of acid phosphates, phenyl acid phosphate, dodecylbenzene sulfonic acid and para-toluene sulfonic acid for the coating with melamine as crosslinking agent.

* * * * *